United States Patent
Shan et al.

(10) Patent No.: US 7,519,197 B2
(45) Date of Patent: Apr. 14, 2009

(54) OBJECT IDENTIFICATION BETWEEN NON-OVERLAPPING CAMERAS WITHOUT DIRECT FEATURE MATCHING

(75) Inventors: Ying Shan, West Windsor, NJ (US); Harpreet Sawhney, West Windsor, NJ (US); Rakesh Kumar, West Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/393,062

(22) Filed: Mar. 30, 2006

(65) Prior Publication Data

US 2006/0245617 A1     Nov. 2, 2006

Related U.S. Application Data

(60) Provisional application No. 60/666,448, filed on Mar. 30, 2005.

(51) Int. Cl.
    *G06K 9/00*          (2006.01)
    *G06K 9/62*          (2006.01)

(52) U.S. Cl. .................... 382/103; 382/159; 382/224

(58) Field of Classification Search .............. 382/103, 382/154, 159, 209, 218, 224, 228, 305; 348/169, 348/47, 48
See application file for complete search history.

(56) References Cited

U.S. PATENT DOCUMENTS 6,678,394 B1 *   1/2004   Nichani ..................... 382/103
2004/0125207 A1 *   7/2004   Mittal et al. ............... 348/169

OTHER PUBLICATIONS

Javed, et al. "KNIGHTM: a Multi-Camera Surveillance System", ONDCP international technology symposium, pp. 1-6, 2003.*
Stauffer "Learning to Track Objects Through Unobserved Regions", IEEE, pp. 1-7, Jan. 2005.*
Javed, et al. "Tracking Across Multiple Cameras with Disjoint Views", IEEE pp. 1-6, Apr. 2003.*
Javed "Scene Monitoring with a Forest of Cooperative Sensors", B.E. Ghulam Ishaq Khan Institute of Engineering Sciences and Technology, pp. 1-151, 1999.*
Javed, et al. "KNIGHTM: A real time surveillance system for multiple overlapping and non-overlapping cameras", IEEE, pp. 649-652, 2003.*

(Continued)

*Primary Examiner*—Daniel G Mariam
(74) *Attorney, Agent, or Firm*—Lowenstein Sandler PC

(57) ABSTRACT

A system and method for identifying objects, particularly vehicles, between two non-overlapping cameras. More specifically, the method and system determines whether a vehicle depicted in an image captured by a first camera is the same vehicle or a different vehicle than a vehicle depicted in an image captured by a second camera. This intra-camera analysis determines whether the vehicle viewed by the first camera is the same as the vehicle viewed by the second camera, without directly matching the two vehicle images, thus eliminating the problems and inaccuracies caused by disparate environmental conditions acting on the two cameras, such as dramatic appearance and aspect changes.

23 Claims, 2 Drawing Sheets

OTHER PUBLICATIONS

Huang, et al. "Object identification in a Bayesian context", pp. 1-7, 1997.*

Stauffer, et al. "Learning patterns of activity using real-time tracking", IEEE, pp. 747-757, 2000.*

Tan, et al. "Multi-camera people tracking using Bayesian networks", IEEE, pp. 1335-1340, 2003.*

V. Kettnaker et al., "Bayesian Multi-Camera Surveillance," Proceedings IEEE Conf. on Computer Vision and Pattern Recognition, CVPR99 (1999).

H. Pasula et al., "Tracking Many Objects With Many Sensors," International Joint Conferences on Artificial Intelligence, pp. 1160-1170, IJ-CAI99 (1999).

D. Huttenlocher et al., "Comparing Images Using the Hausdorff Distance," IEEE Trans. Pattern Analysis and Machine Intelligence (PAMI), vol. 15, No. 9, pp. 850-863 (1993).

C. Olson, et al., "Automatic Target Recognition By Matching Oriented Edge Pixels," IEEE Trans. Image Processing, vol. 6(1), pp. 103-113 (1997).

D. Jacobs et al., "Classification with Nonmetric Distances: Image Retrieval and Class Representation," IEEE Trans. Pattern Analysis and Machine Intelligence (PAMI), vol. 22(6), pp. 583-600 (2000).

* cited by examiner

OBJECT IDENTIFICATION BETWEEN NON-OVERLAPPING CAMERAS WITHOUT DIRECT FEATURE MATCHING

CROSS-REFERENCE TO RELATED APPLICATION

This application claims the benefit of U.S. Provisional Application No. 60/666,448 filed on Mar. 30, 2005. U.S. Provisional Application No. 60/666,448 is hereby incorporated by reference herein.

FIELD OF THE INVENTION

The present invention relates generally to object identification, particularly to a system and method for monitoring and tracking one or more vehicles.

BACKGROUND OF THE INVENTION

Surveillance of a particular environment, such as a vehicle roadway, using a series of successive cameras includes many inherent problems. Frequently, successive cameras, referred to as camera pairs, are "non-overlapping," meaning that the areas viewed or monitored by each camera does not overlap with the subsequent camera in the series. An example non-overlapping camera environment may be a complex road network with stationary cameras fixed along the road network, wherein the number of cameras is minimized to provide large area coverage, and hence the cameras do not overlap. As such, for a given environment, there are "gaps" or portion of the environment which are not monitored by a camera. In these cases, a vehicle passes through a viewable range of a first camera and is tracked. The vehicle then proceeds into a gap, or non-monitored area. The vehicle then enters the viewable range of the second camera (the next successive camera in the series). For certain applications, it is critical to track and identify a vehicle as it spans the distance covered by the two cameras. As such, the image or images of that vehicle identified by the first camera must be matched with the image or images of the same vehicle identified by the second camera. For example, identifying that the vehicle captured by the first camera is the same as the vehicle captured by the second camera may allow law enforcement agencies or other government entities to determine the rate of speed of the vehicle and/or the direction that vehicle is traveling. In addition, vehicle identification may be used for wide-area freeway traffic surveillance and control, specifically to measure link travel time (i.e., the actual time taken for traffic to travel between two fixed points on the freeway network), and to track the total number of vehicles traveling between any two points on the network in a given time interval.

Another conventional approach to computing the probability that two vehicle observations across two cameras are derived from the same vehicle or two different vehicles involves aligning and matching oriented edge images of pairs of vehicles across two cameras on the basis of which the same-different probabilities are learned. However, given the variations in appearances and aspect of the same vehicle across disparate observations (i.e., cameras having different surroundings and environmental influences), direct matching according to this approach may not consistently provide a reliable means of computing same-different probabilities.

Other exemplary approaches rely on direct object matching and feature learning to identify and track objects between multiple cameras. See e.g., "Bayesian multi-camera surveillance" by V. Kettnaker et al., published in *Proceedings IEEE Conf. on Computer Vision and Pattern Recognition* (CVPR99) (1999) and "Tracking many objects with many sensors" by Hanna Pasula et al., published in *International Joint Conferences on Artificial Intelligence*, pages 1160-1171 (IJ-CAI99) (1999).

However, directly matching vehicle objects between a pair of non-overlapping cameras can be very difficult due to drastic environmental differences between the two cameras, such as illumination, appearance and aspect changes.

Therefore, there is a need for a method and a system for efficiently and effectively matching a vehicle across non-overlapping camera pairs, without inter-camera matching.

SUMMARY OF THE INVENTION

The above-described problems are addressed and a technical solution is achieved in the art by an intra-camera object classification method for identifying objects, particularly vehicles, across a monitored environment having two or more non-overlapping cameras. More specifically, the present invention determines whether a vehicle depicted in an image observed by a first camera of a camera pair is the same vehicle or a different vehicle than a vehicle depicted in an image observed by a second camera of the camera pair. The determination as to whether the vehicles are the same or different may be computed without matching the two vehicle images directly, which is a process vulnerable to drastic appearance and aspect changes.

According to an embodiment of the present invention, the intra-camera object classification method comprises a training stage and a classification stage. The training stage comprises a series of steps and processes designed to learn a training classifier, which defines the relationship between the two cameras of the camera pair, without the use of cross-camera feature or object matching.

According to an embodiment of the present invention, during the training stage, each vehicle image is represented as an embedding amongst representative exemplars, or prototype objects that are representative of a class or sub-class of objects, selected for each camera. The intra-camera object classification method comprises an automatic exemplar selection process based on a joint redundancy measurement determination coupled with a clustering analysis.

For a class of like vehicles, an observation of a vehicle in a given camera may be represented using comparative distances to a set of representative vehicle observations (i.e., the exemplars) made by the same camera. According to an embodiment of the present invention, a camera-specific embedding vector is computed for each camera, wherein the embedding vector comprises a number of components each representing a non-metric distance or comparison of the observed vehicle relative to the one or more exemplars. According to an embodiment of the present invention, the non-metric distances (i.e., the components of the embedding vector) are computed using robust matching of oriented edge images.

According to an embodiment of the present invention, the non-metric distance embeddings of vehicle observations within a camera and the corresponding embeddings in the other camera serve as a means of characterizing similarities and differences between vehicles across the cameras. To compute these distances, a comparison of observations is conducted within a single camera. Since the camera is fixed, all observations are similarly affected by illumination and other environmental effects, as well as the camera aspect. Therefore, robust alignment and matching within the same camera may be applied to accurately capture the similarities and differences amongst the vehicles.

As such, the camera-specific embedding vectors are then combined to characterize or define the relationship between the observations of the two cameras.

During the training stage, training data representing a known object match (i.e., the same blue Honda Civic is observed by each camera and identified as the same by an operator) is compared to the exemplars for each camera to produce an embedding vector for each camera relating to the same object. Next, when the embedding vectors for each camera are compared, based on the knowledge that the object represented by the embedding vectors is in fact the same (as determined by a visual inspection by an operator), the relationship between the two embedding vectors may be learned and a training classifier may be encoded which represents that relationship.

According to an embodiment of the present invention, a set of truth training examples of same-different vehicle pairings across the two cameras may be used to learn a training classifier that encodes the probability distributions. During the classification stage, the training classifier may be applied to a pair of the embeddings representing two vehicles observed by a camera pair to compute the same-different probability. In order for the vehicle exemplars to be representative for both cameras, the present invention provides for the use of a method for jointly selection of corresponding exemplars using the training data.

According to an embodiment of the present invention, the method computes the same-different probabilities for pairs of disparate observations without the need for directly matching the observations across cameras. Advantageously, according to an embodiment of the present invention, any vehicle observed by any camera in the monitored environment may be represented as a vector of distances to the respective exemplars within that camera, two such vector representations may be compared to produce the probabilities of two disparate observations being of the same or different vehicles.

According to an embodiment of the present invention, problems in the art are alleviated by computing robust non-metric distance measures between a pair of vehicle objects. using robust alignment and matching, embedding the vehicle object relative to the camera-specific exemplars in each individual camera, and using the embedded distance vectors of two query objects (i.e., vehicle observations) to compute same-different probabilities using a probabilistic support vector machine (SVM) trained based on a set of truth training examples of same-different vehicle pairings between the two cameras.

Instead of computing a linear projection within the space spanned by the basis shapes/textures, the present invention uses a vector-based embedding process to determine the "distances" or differences between a vector representation of a query image and a vector representation of the exemplars. Advantageously, the distance measure may be non-metric. Moreover, the relationship between the embedding coordinate system of the two views (i.e., the first camera and the second camera) is automatically learned, and is not assumed to be linear.

According to an embodiment of the present invention, the method computes meaningful distances by applying a robust edge-based distance measuring approach to a non-metric distance measurement.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

The present invention relates to an intra-camera object matching method and system for determining whether a vehicle identified by a first camera of a camera pair, herein "Camera I," is the same as a vehicle identified by a second camera in the camera pair, herein "Camera J," without cross-camera object or feature matching. Although the present invention is described as tracking, monitoring, and identifying "vehicles," one having ordinary skill in the art will appreciate that the present invention may be used to track and identify any object observable by multiple cameras monitoring an environment.

The present invention relates to an intra-camera object classification method configured to track and monitor an environment including moving objects (e.g., a road network or highway). One having ordinary skill in the art will appreciate that Camera I and Camera J may be adjacent or neighboring cameras within the camera arrangement designed to monitor the environment, or, alternatively, the two cameras may be non-successively arranged.

Figure 1:
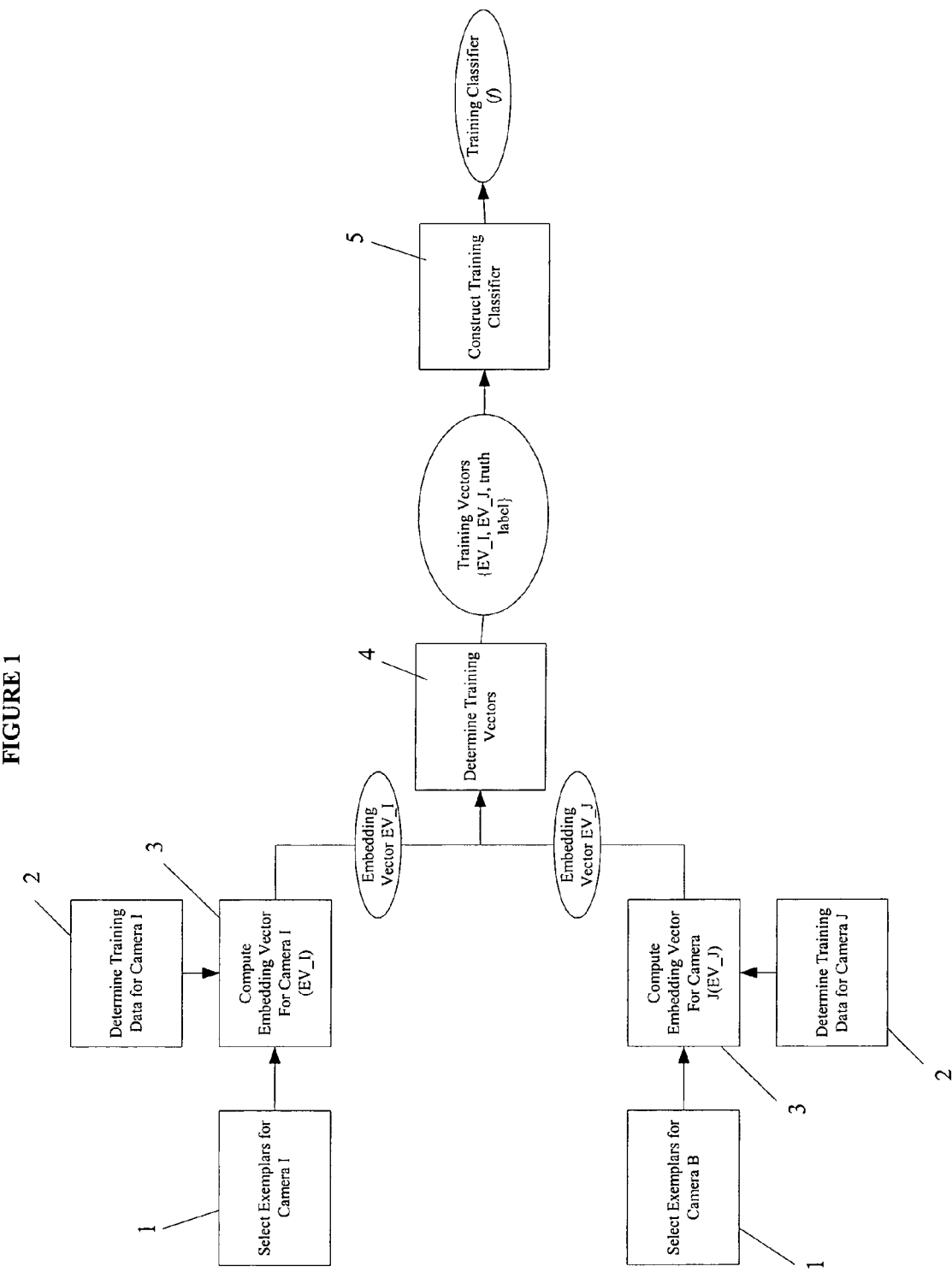
FIG. 1 illustrates the process flow for an exemplary training stage, according to an embodiment of the present invention.
Figure 2:
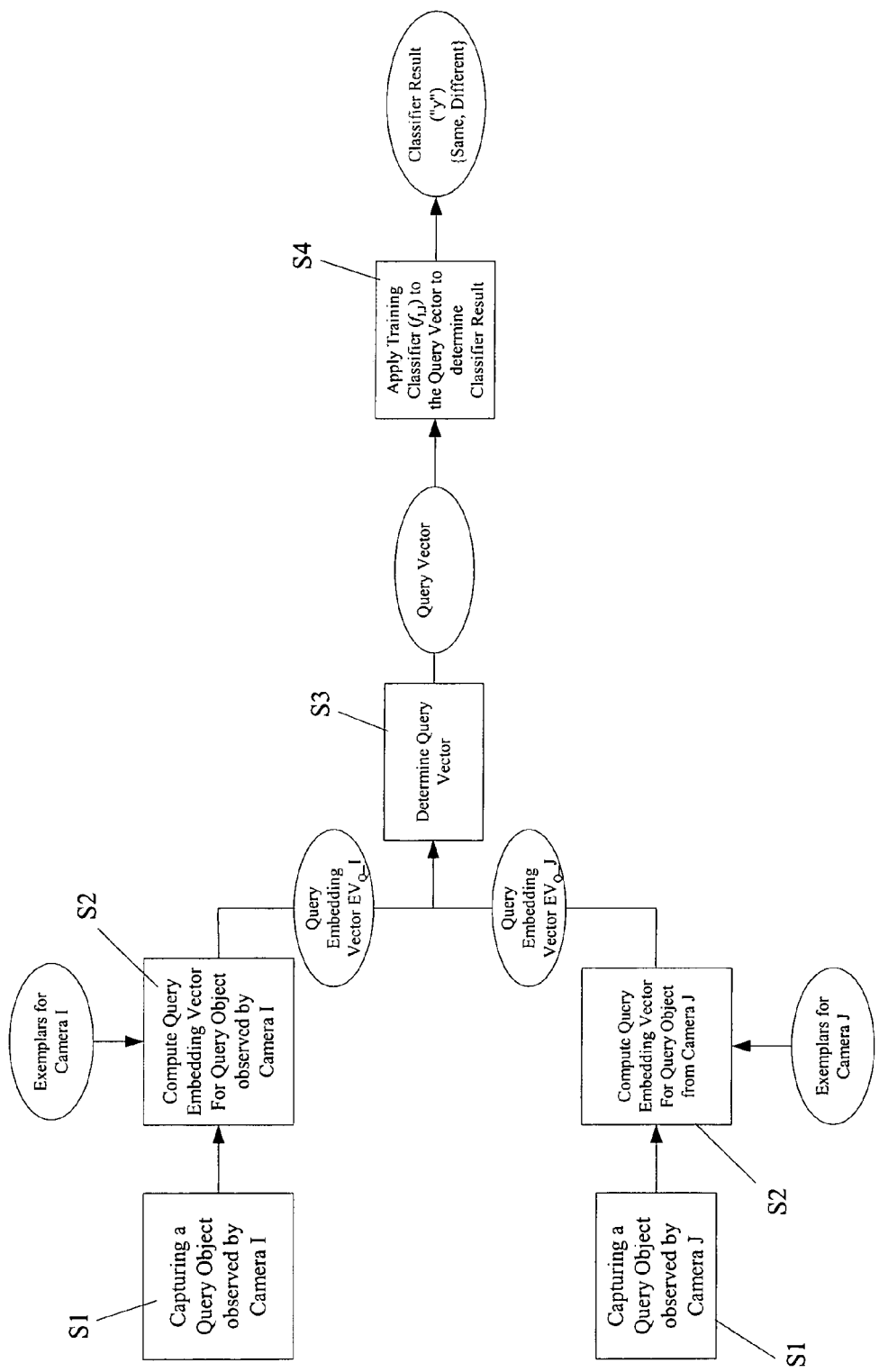
FIG. 2 illustrates a process flow for an exemplary classification stage, according to an embodiment an embodiment of the present invention.

According to an embodiment of the present invention, the intra-camera object matching method comprises two primary stages: 1) a training stage (illustrated in FIG. 1) and 2) a classification stage (illustrated in FIG. 2).

The present invention relates to an intra-camera object classification system comprising one or more camera pairs, wherein each pair comprises a first camera and a second camera, communicatively connected to a computer-based system comprising one or more computers configured to execute the steps of the intra-camera object classification method, according to an embodiment of the present. The term "computer" is intended to include any data processing device, such as a desktop computer, a laptop computer, a mainframe computer, a personal digital assistant, a server, a handheld device, or any other device able to process data. The term "communicatively connected" is intended to include any type of connection, whether wired or wireless, in which data may be communicated. The term "communicatively connected" is intended to include a connection between devices and/or programs within a single computer or between devices and/or programs on separate computers. One having ordinary skill in the art will appreciate that at least a portion of the intra-camera object classification system may include human-based components, such as, for example, a system operator.

According to an embodiment of the present invention, during the training stage, a "training classifier" is determined which may be used during the classification stage to determine a "classifier result" (y). The classifier result (y) is a determination of whether one or more images of an object, herein referred to as the "Query Object" observed by Camera I is the same or different than a Query Object observed by Camera J.

For a given pair of cameras, Camera I and Camera J, denoted as $C_I$ and $C_J$, respectively, the probability density function is estimated according to the following expressions:

$$P(y/same, C_I, C_J) \equiv P(y/S_{I,J})$$

$$P(y/different, C_I, C_J) \equiv P(y/D_{I,J}), \quad \text{Equation (1)}$$

where $P(y/S_{I,J})$ and $P(y/D_{I,J})$ are the probability density functions of a measurement vector y given that two Query Objects are of same/different vehicles, and $$y = f_{I,J}(E_K^I, E_L^J) \quad \text{Equation (2)}$$

where "$f_{I,J}$" is a function of two observed edge maps (referred to as the training classifier, described in detail below), and $E_K^I$ and $E_L^J$ corresponding to the Kth and Lth observations made by cameras $C_I$ and $C_J$, respectively.

According to an embodiment of the present invention, during the training stage, given a set of edge maps $\epsilon_I = \{E_K^I, K=1, \ldots, N\}$ for Camera I, and a set of corresponding edge maps $\epsilon_J = \{E_K^J, K=1, \ldots, N\}$ for Camera J, the probability density functions in Equation (1) are computed without directly matching the edge maps $E_L^I$ and $E_L^J$. Note here the correspondences between the two edge sets may be manually labeled by an operator, and the number of edge maps N is the same for both sets.

According to an embodiment of the present invention, for each pair of edge maps $E_X^I$ and $E_Y^J$, the measurement vector y between the edge maps and the same-different probabilities according to the learned probability density functions in Equation (1) are computed, without direct matching.

FIG. 1 illustrates the steps involved in an exemplary training stage, according to an embodiment of the present invention. The object of the training stage is to generate the training classifier, denoted by "$f_{I,J}$", which is a mathematical function or expression that identifies whether a pair of objects (e.g., vehicles) viewed by a first camera (Camera I) and a second camera (Camera J) are the same or different. In order to determine the training classifier which appropriately represents the relationship between Camera I and Camera J, the relationship must be learned, during the training stage.

In the first step in the training stage, a set of exemplars are selected for each camera, as shown in step 1. The exemplars are prototype objects which represent a class of objects observed by the camera. For vehicles, a number of classes, each having one or more exemplars may be selected, wherein the classes include, for example, a sedan class, a sport utility vehicle class, a pickup truck class, etc. One having ordinary skill in the art will appreciate that for a given class, there may be many sub-classes, particularly those classes having great variety. For example, a broad class, such as a sedan, may have a number of sub-classes to provide a specified classification represented by associated exemplars.

The exemplars are selected for each camera, and thus take into consideration the environmental factors influencing the observations made by the camera.

According to an embodiment of the present invention, the exemplars for each are represented by a vector having any number of dimensions, wherein the number of dimensions of the vector corresponds to the number of features used to define the object (i.e., size, color, shape, wheel base, etc.).

According to an embodiment of the present invention, each exemplar is generated by taking the class features/properties, each of which represents one dimension in the vector representation of the exemplar, perform a clustering of the feature vectors, and determine the center of the cluster. The center point of the feature cluster represents the exemplar for that class or subclass.

The following is a description of an exemplary method for the automatic exemplary selection based on the corresponded edge sets of the two cameras, as shown in step 1 of FIG. 1. In step 1, exemplars that are representative of the edge sets of both cameras. To do so, a set of exemplar pairs, denoted as "C", is selected jointly from both sets of edge maps $\epsilon_A$ and $\epsilon_B$, and represented by the following expression:

$$C = \{(E_K^I, E_K^J)\} | K=1, \ldots, O\}$$

wherein O is the number of the exemplars, and $(E_K^I, E_K^J)$ are the pair of corresponding edge maps selected from both sets of the edge maps.

According to an embodiment of the present invention, a robust distance measure is computed that takes into account both inlier and outlier pixels of the corresponding images for two aligned edge maps, $E_A$ and $E_B$, wherein p is defined as a point in $E_A$, and wherein q is the closest point top in $E_B$.

In order to do so, the following edge-based measurements are determined: 1) pointwise distance ("d") and 2) angular difference ("a"), according to the following equations:

$$d^p_{A \to B} = \|p - q\|_1, \quad \text{Equation (3)}$$

$$a^p_{A \to B} = \theta p - \theta q, \quad \text{Equation (4)}$$

wherein d and a denote the pointwise distance and the angular difference, respectively; $\theta p$ and $\theta q$ are the edge directions defined at the edge points p and q, respectively; and the subscript $A \to B$ denotes that the closest point is defined from $E_A$ to $E_B$.

Based on the first two edge-based measures, a robust match score between a pair of edge maps is derived as:

$$\gamma = \frac{\sum_{A \to B_I} h(d^p, \alpha) + \sum_{B \to A} h(d^p, \delta) h(a^p, \alpha)}{N(A) + N(B)} \quad \text{Equation (5)}$$

where N(A) and N(B) are the numbers of edge pixels of the edge maps $E_A$ and $E_B$, $\gamma \equiv \gamma_{A,B}$, $h(x,c) = (1-|x|/c)$ for $|x| < c$, $h(x,c) = p$ for $|x| \geq c$, p is a small positive number, and $d^p$ and $a^p$ are defined as in Equations (3) and (4). The constants $\delta$ and $\alpha$ may either be predefined and kept the same for all pairs of cameras, or statistically computed from the data of each camera as by estimating the inlier and outlier processes according to a method known in the art. Since the score is in the range of [0, 1], the distance measure may be defined as:

$$d_{A,B} = 1 - \gamma_{A,B} \quad \text{Equation (6)}$$

Accordingly, as shown in Equations (5) and (6), the score converts the pointwise distance (d) and angular difference (a) into a single robust match measure. Advantageously, this score provides superior results as compared to those realized using a truncated Chamfer distance (see, e.g., "*Comparing images using the Hausdorff distance*," by B. Stenger et al., *IEEE Trans. Pattern Analysis and Machine Intelligence (PAMI)*, Volume 9(15): pages 850-863 (1993)) and the robust Hausdorff distance methodology (see, e.g., "Automatic target recognition by matching oriented edge pixels," IEEE Trans. Image Processing, Volume 6(1), pages 103-113 (1997)).

One having ordinary skill in the art will appreciate that the distance measure as expressed by Equation (5) is symmetric. However, like many other robust distances, Equation (5) is non-metric measurement because the triangle inequity is not guaranteed.

For all pairs of edge maps in both edge sets $\epsilon_I$ and $\epsilon_J$, dissimilarity matrices $D_I$ and $D_J$ may be computed, according to the distance measure defined in Equation (6). An entry of the matrix $D_I$ represents the distance for a pair of edge maps in Camera I. Similarly, an entry of the matrix $D_J$ represents the distance for a pair of edge maps in Camera J.

Next, using the edge sets $\epsilon_I$ and $\epsilon_J$, the set of exemplar pairs $C=\{(E_K^I, E_K^J)\} |K=1, \ldots, O\}$ that are representative for both cameras is computed. A standard method of computing representative objects from a given metric dissimilarity matrix involves the use of a suitable clustering method, such as, for example, the Kolmogorov clustering algorithm. For non-metric distances, the article titled "*Class representation and image retrieval with non-metric distances,*" by D. Jacobs et al., IEEE Trans. Pattern Analysis and Machine Intelligence (PAMI), Volume 22(6):583-600 (2000), provides for the computation of redundancy as a more meaningful measure of whether one object may be replaced by another. As a result, matrices $D_I$ and $D_J$ are first converted into redundancy matrices $Q_I$ and $Q_J$, as described in detail below. In order to enforce the constraint that the exemplars are representative for both cameras, a joint dissimilarity matrix J is defined based on $Q_I$ and $Q_J$, and a suitable clustering algorithm (e.g., a Kolmogorov clustering algorithm) is used use to compute the exemplars.

Given a robust distance-based dissimilarity matrix $D=\{d_{A,B}\}$, where $E_A$ and $E_B$ are two aligned edge maps, redundancy matrix Q may be defined as $Q=\{q_{A,B}\}$ such that $$q_{A,B} = \text{corr}(v_A, v_B), \quad \text{Equation (7)}$$

where "corr" denotes correlation coefficients, and $v_A$ and $v_B$ are the distance vectors defined as:

$$v_X = \{d_{X,K} | \forall K \in \epsilon, K \neq A, B\} \quad \text{Equation (8)}$$

wherein X is either A or B; $v_X$ is a vector of distances between the edge map X to all other edge maps except A and B in the same edge set $\epsilon_I$ or $\epsilon_J$. The quantity $q_{A,B}$ defined in Equation (7) is a correlation-based estimation of redundancy, which is the probability that $|d_{A,K} - d_{B,K}|$ is small for an arbitrary edge map K. In the case when the distance measure d is Euclidean, $|d_{A,K} - d_{B,K}|$ is necessarily small provide $|d_{A,B}|$ is small, due to the triangle inequality. However, when the distance is non-metric, Equation (7) provides a more meaningful estimation of redundancy.

Given a pair of edge maps $(E_A^I, E_B^I)$ for Cameras I and a corresponding pair of edge maps $(E_A^J, E_B^J)$ for Camera J, whether the event $|d^I_{A,K} - d^I_{B,K}|$ is small is independent of whether the event $|d^J_{A,K} - d^J_{B,K}|$ is small. Therefore, according to an embodiment of the present invention, the automatic exemplar selection process in step 1 may be performed using the joint redundancy $u_{A,B}$, expressed as:

$$u_{A,B} = q^I_{A,B} * q^J_{A,B} \quad \text{Equation (9)}$$

where $q^I_{A,B}$ and $q^J_{A,B}$ are the redundancies of A and B for Camera I and Camera J, respectively.

Accordingly, a dissimilarity matrix $J=\{v_{A,B}\}$ based on the joint redundancy may be defined, where $v_{A,B}=1-u_{A,B}$, and compute the exemplars using a suitable clustering method, such as, for example, Kolmogorov clustering. By construction, the edge maps of the exemplars computed are representative of both edge sets.

Referring to FIG. 1, having selected the exemplars for each camera (Camera I and Camera J) in step 1, training data is determined for each camera, in step 2. The training data is a collection of training samples, wherein each sample includes a training set, or pair of images, wherein each image in the pair depicts a vehicle as observed by Camera I and Camera J. One having ordinary skill in the art will appreciate that the training data selected for Camera I is the same as the training data for Camera J. For example, "Training Data Pair 1"= (Training Data I1, Training Data J1) wherein "Training Data I1" is a multi-dimensional vector representation of a vehicle "1" (a BMW, white, 5 series, 1998) as observed by Camera I, and "Training Data J1" is a multi-dimensional vector representation of the same vehicle, Vehicle "1" as observed by Camera J.

For each training data pair, an operator, by a visual inspection, determines if the two vehicles are the same or different. If the two vehicles are the same, the training data pair is assigned a "truth label" of "same". If the training data pair includes two different vehicles, then the training data pair is assigned a truth label of "different" by the operator.

According to an embodiment of the present invention, the training data ("T") may be represented as:

$$T = \{(E_K^I, E_K^J, l_K | K=1, \ldots, T\},$$

where $l_K = \{0,1\}$ is the "truth label" (wherein "0"="different" and "1"="same") for the pair of edge maps $E_K^I$ and $E_K^J$, and T is the number of training samples.

Next, in step 3, for each camera (I, J) the training data is compared to each of the exemplars to compute an embedding vector (EV_I for Camera I and EV_J for Camera J). The embedding vector (EV) is a vector representation of a comparison of the training data and the exemplars.

For example, Training Data I1 may be compared to a number of Exemplars (three in this example), such that the comparison results in the following:

| Training Data Identifier | Exemplar | Distance |
| --- | --- | --- |
| Training Data I1 | Exemplar 1 | 0.1 |
| Training Data I1 | Exemplar 2 | 0.5 |
| Training Data I1 | Exemplar 3 | 0.7 |

In step 3, for each camera, an embedding vector (denoted as EV_I for Camera I and EV_J for Camera J) is computed which represents each of the distances of each training data sample (e.g., Training Data I1) in comparison to the Exemplars, such as V_A=(0.1, 0.5, 0.7, etc.). For example, the embedding vector may be a 10 dimensional vector for a camera including 10 exemplars. The embedding vector (EV_I, EV_J) represents a relationship between the training Data and the exemplars selected for that camera in a fashion that characterizes the image of the vehicle as it relates the all of the exemplars, for a more comprehensive comparison and reference.

According to an embodiment of the present invention, the embedding vectors may be computed according to the following approach. From a set of exemplar pairs $C=\{(E_K^I, E_K^J)\} |K=1, \ldots, O\}$, each edge map of a pair of query edge maps (X, Y) may be embedded into a vector space as following:

$$v_X = [d_{X, E_1}^I, d_{X, E_2}^I, \ldots, d_{X, E_O}^I],$$

$$v_Y = [d_{Y, E_1}^J, d_{Y, E_2}^J, \ldots, d_{Y, E_O}^J],$$

The above represents a Lipschitz embedding of the query edge map with respect to the exemplar edge maps of each camera, as is known in the art. The basic assumption of the Lipschitz embedding is that two nearby points have similar distances to any third point. In general, this property does not hold for non-metric distance measures, such as those used in the present invention. However, it has been observed that in practice the cases wherein the triangle inequality is violated are rare and have limited impact on the accuracy of the embedding. As such, the embedding vectors of Equation (10) are used to directly form the final representation of the pair of query edge maps, as follows:

$$y=[v_X, v_Y]$$

wherein y is the concatenation of two embedding vectors $v_X$ and $v_Y$. It is important to note that the computation of y does not involve any direct matching between the two query edge images.

Given a training set $T=\{(E_K^I, E_K^J, t_K)|K=1,\ldots,T\}$, where $t_K=\{0,1\}$ is the truth label for the pair of edge maps $E_K^I$ and $E_K^J$, and T is the number of training samples, the representation $y_K$ is computed for each training sample in the training set. Next, a probabilistic version of SVM is used to train a classifier using the truthed representation set $\{(y_K, t_K)|K=1,\ldots,T\}$. As such, given a pair of query edge maps, the same-difference probability may be computed from the training classifier, as described in detail below.

Next, in step 4, the embedding vectors for Cameras I and J (EV_I, EV_J) and the operator-provided truth label are used to determine training vectors. As described above, the truth label is either "same" or "different" based on a visual inspection of the two training data pairs. For example, an operator, by a visual inspection, may determine that the BMW as observed by Camera I is the same as the BMW observed by Camera J, and assign a truth label of "same" to that training data set. Then, the embedding vector for that training data set is determined in step 3 is coupled with the truth label. Accordingly, since it is known that the vehicle is the same, the embedding vectors EV_I, EV_J are given context. Next, the training vector, which includes an association of the two embedding vectors and the truth label, to define a relationship between the embedding vectors of the two cameras when the outcome (i.e., the truth label) is known.

In step 5, a training classifier is computed based on the training vectors, as determined in step 4. In this step, a probabilistic support vector machine (SVM) or other similar system, method or machine, may be trained using the training vectors to learn a training classifier that represents the relationship between the truth label and the embedding vectors EV_A, EV_B.

In terms of a the simple expression in Equation (2):

$$y=f_{I,J}(E_K^I, E_L^J) \quad \text{Equation (2)}$$

given that y=the truth label value (i.e., the known classifier assigned by the operator); x=EV_I, EV_J (the embedding vectors as computed in step 4), the function ($f_{I,J}$), referred to as the training classifier, required to satisfy the equation is computed. For example, if it is known that the two images of the training data pair are of the same vehicle, I1=J1, and knowing the corresponding embedding vectors, the function to be applied to the embedding vectors to generate this relationship may be determined.

FIG. 2 illustrates the process flow of an exemplary classification stage of the method, according to an embodiment of the present invention. The classification stage provides for the application of the training classifier as determined during the training stage (see step 5 in FIG. 1). Knowing the relationship between the cameras of the camera pair (Camera I and Camera J), as represented by the training classifier, the goal of the classification stage of the intra-camera object matching method is to determine if unknown images, herein referred to as Query Objects, observed by the two cameras, are the same or different.

Referring to FIG. 2, in step S1, a first image of a vehicle, or first Query Object, is observed and captured by Camera I, and a second image of a vehicle, or second Query Object, is observed and captured by Camera J. According to an embodiment of the present invention, the goal of the classification stage is to determine whether the first Query Object is the same as or different from the second Query Object. Next, in step S2, for each camera, the query object is compared to the same exemplars used during the training stage to compute an query-based embedding vector ($EV_Q\_I$, $EV_Q\_J$). The query embedding vectors EV_I and EV_J each denote a local, or intra-camera representation of the exemplar-to-Query Object comparison.

The query embedding vector computed for each camera is then used to determine a Query Vector, in step S3. The Query Vector ("QV") represents a relationship between $EV_Q\_I$ and $EV_Q\_J$, equivalent to the expression $(E_K^I, E_L^J)$ of Equation (2). The Query Vector (QV) is a stacked vector comprising the stacking of EV_I and EV_J. For example, the Query Vector may be a 10+10 dimensional vectors, wherein EV_I and EV_J are each 10 dimensional vectors.

Next, in step S4, the training classifier, computed during the training stage, is applied to the Query Vector {QV_I, QV_J} to determine a classifier result. Again, referring to Equation (2), the training classifier "$f_{I,J}$" is applied to the Query Vector (the equivalent of EV_I and EV_J in Equation (2)) to determine the appropriate classifier, or "y", of Equation (2). wherein y is either "same" or "different".

As such, unlike the training stage, when the classifier result y is known (as assigned by the operator), in the classification stage the classifier result y is unknown. To determine the classifier result y, the training classifier, or function, is applied to the known Query Vector, which is a representation of the relationship between the embedding vectors of each camera (Camera I and Camera J) as compared to the Query Object observed by each camera, in order to determine the Query Object is the "same" or "different."

Advantageously, the classifier result may be obtained without executing computations across the cameras of a camera pair. In addition, according to an embodiment of the present invention, the classifier result may be realized without performing cross-camera feature matching.

According to an embodiment of the present invention, the environmental conditions which are unique and specific to each camera are considered and taken into account in the selection of the exemplars and computation of camera-specific embedding vectors. As such, the association of the embedding vectors of the two cameras establishes the relationship between the two cameras to produce the training classifier, which may be applied to further observations of the cameras.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An intra-camera object classification method, comprising the steps of:
   selecting exemplars for a first camera and a second camera, wherein the exemplars are camera-specific;
   determining training data including a truth label for the first camera and the second camera;
   computing an embedding vector for the first camera based at least on a comparison of the exemplars and the training data of the first camera;
   computing an embedding vector for the second camera based at least on a comparison of the exemplars and the training data of the second camera;
   determining a training vector comprising the embedding vector of the first camera, the embedding vector of the second camera, and the truth label; and
   constructing a training classifier based at least on a comparison of the embedding vectors and the truth label of the training vector.

2. The method of claim 1, wherein the step of selecting the exemplars comprises using a joint redundancy measurement determination.

3. The method of claim 1, wherein the step of selecting the exemplars comprises using a combination of a joint redundancy measurement determination and a clustering analysis.

4. The method of claim 1, wherein the training vector represents a relationship between the first camera and the second camera generated without direct feature matching.

5. The method of claim 1, wherein the query vector represents a relationship between the first camera and the second camera generated without direct feature matching.

6. The method of claim 1, wherein the training classifier is a probabilistic support vector machine (SVM) classifier trained based on at least the embedding vectors of the first and second camera.

7. The method of claim 1, wherein the first camera and the second camera are non-overlapping.

8. The method of claim 1, wherein the exemplars are representative of a class of objects.

9. The method of claim 1, wherein the exemplars are representative of a sub-class of objects.

10. The method of claim 1, wherein the truth label is determined by an operator based on a visual inspection of the training data.

11. The method of claim 1, wherein the training data comprises a collection of training data pairs of same and different objects, as indicated by the truth label.

12. The method of claim 1, further comprising the steps of:
    capturing a first query object observed by the first camera;
    capturing a second query object observed by the second camera;
    computing a query embedding vector for the first camera based on a comparison of at least the exemplars selected for the first camera and the first query object;
    computing a query embedding vector for the second camera based on a comparison of at least the exemplars selected for the second camera and the second query object;
    determining a query vector comprising the query embedding vector of the first camera and the query embedding vector of the second camera; and
    applying the training classifier to the query vector to determine a classifier result.

13. The method of claim 12, wherein the classifier result indicates that the first query object and the second query object are the same.

14. The method of claim 12, wherein the classifier result indicates that the first query object and the second query object are different.

15. The method of claim 12, wherein the first and second query objects comprise vehicle.

16. An intra-camera object classification system comprising:
    a training stage for determining a training classifier representing a learned relationship between a first camera and a second camera, wherein the relationship is learned without cross-camera matching; and
    a classification stage for applying the training classifier to determine whether a first query object observed by a first camera matches a second query object observed by a second camera.

17. The system of claim 16, wherein the training stage comprises automatically selecting camera-specific exemplars using a joint redundancy measurement determination.

18. The system of claim 17, wherein the camera-specific exemplars are compared to camera-specific training data to compute a camera-specific embedding vector.

19. The system of claim 18, wherein a first camera-specific embedding vector and second camera-specific embedding vector are associated with a truth label to form a training vector.

20. The system of claim 19, wherein a SVM uses the training vector to map the first camera-specific embedding vector and a second camera-specific embedding vector to construct the training classifier.

21. The system of claim 16, wherein the training stage comprises automatically selecting camera-specific exemplars using a joint redundancy measurement determination and a clustering analysis.

22. A computer-readable storage medium storing computer code for intra-camera object classification, wherein the computer code comprises:
    code for selecting exemplars for a first camera and a second camera, wherein the exemplars are camera-specific;
    code for determining training data including a truth label for the first camera and the second camera;
    code for computing an embedding vector for the first camera based at least on a comparison of the exemplars and the training data of the first camera;
    code for computing an embedding vector for the second camera based at least on a comparison of the exemplars and the training data of the second camera;
    code for determining a training vector comprising the embedding vector of the first camera, the embedding vector of the second camera, and the truth label; and
    code for constructing a training classifier based at least on a comparison of the embedding vectors and the truth label of the training vector.

23. The computer-readable storage medium storing computer code of claim 22, further comprising:
    code for capturing a first query object observed by the first camera;
    code for capturing a second query object observed by the second camera;

code for computing a query embedding vector for the first camera based on a comparison of at least the exemplars selected for the first camera and the first query object;

code for computing a query embedding vector for the second camera based on a comparison of at least the exemplars selected for the second camera and the second query object;

code for determining a query vector comprising the query embedding vector of the first camera and the query embedding vector of the second camera; and code for applying the training classifier to the query vector to determine a classifier result.

* * * * *